United States Patent

Sandler

[11] 4,125,733
[45] Nov. 14, 1978

[54] 2,3-DIBROMOPROPYL POLYOXYETHYLENE TRIMELLITATE

[75] Inventor: Stanley R. Sandler, Springfield, Pa.

[73] Assignee: Pennwalt Corporation, Philadelphia, Pa.

[21] Appl. No.: 836,287

[22] Filed: Sep. 26, 1977

[51] Int. Cl.² .............................................. C07C 69/76
[52] U.S. Cl. .............................. 560/87; 260/45.85 T; 260/340.2; 260/346.3; 427/390 D; 427/394
[58] Field of Search ......................................... 560/87

[56] References Cited

U.S. PATENT DOCUMENTS

| | | | |
|---|---|---|---|
| 3,236,659 | 2/1966 | Wygant et al. .......................... | 106/15 |
| 3,317,568 | 5/1967 | Wygant et al. .......................... | 560/87 |

*Primary Examiner*—Jane S. Myers

[57] ABSTRACT

A compound of the formula

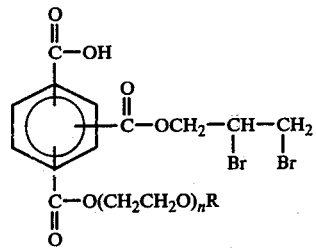

is provided that is useful for imparting soil release properties and durable flame retardancy to textiles such as all-polyester fabric either alone or in combination with other textile chemicals.

6 Claims, No Drawings

2,3-DIBROMOPROPYL POLYOXYETHYLENE TRIMELLITATE

BACKGROUND OF THE INVENTION

1. FIELD OF THE INVENTION

This invention relates to 2,3-dibromopropyl polyoxyethylene trimellitate and to the use thereof as flame retardant and soil release agents for textiles.

2. DESCRIPTION OF PRIOR ART

Prior to the present invention tris(2,3-dibromopropyl) phosphate (called "Tris") was a flame retardant finish for 100% polyester; it has the disadvantages of causing increased soil retention and being toxic. Attempts to solve this problem by using the fluorochemical soil release agent, "FC-218," (a product of the 3M Company) in combination with the Tris compound have not been satisfactory because of high cost and insufficient durability to repeated launderings. The use of non-fluorochemical soil release agents with the Tris compound such as "Zelcon TGF", a Dupont product, is less costly but the combination is still not durable to the 50 launderings required by the children's sleepwear standard DOCFF-3-71.

Tris(2,3-dibromopropyl)trimellitate is also known in the prior art as a flame retardant for fibrous cellulosic materials. See U.S. Pat. No. 3,236,659.

Neither of the above-mentioned prior art compounds comes within the scope of the present invention. The compound of the present invention imparts durable flame retardancy to 100% polyester fabric at lower bromine add-on levels than the above mentioned Tris compound while also imparting significantly improved water absorption and wicking properties. In addition the compound of this invention is phosphorous-free and therefore does not pollute the environment.

STATEMENT OF INVENTION

The present invention is directed to 2,3-dibromopropyl polyoxyethylene trimellitate having the formula:

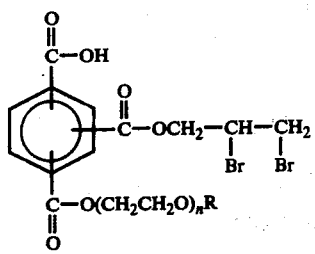

wherein
(a) the ring is 1,2,4 substituted;
(b) R is selected from H, —CH$_3$ or

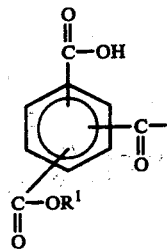

with the ring being 1,2,4 substituted:
(c) R$^1$ is selected from $$-CH_2-CH-CH_2,$$
$$\quad\quad\;\; | \quad\;\; |$$
$$\quad\quad\; Br \;\; Br$$

$+\!\!(CH_2CH_2O\!\!)_{\overline{n}}-$ or $-\!\!(CH_2CH_2O\!\!)_{\overline{n}}CH_3$; and (d) n is 6–23.

This invention is also directed to a method of treating a polyester fabric to give the fabric flame retardancy with less tendency to soil and water wicking properties comprising:

(a) wetting a polyester fabric with a composition containing the compound of claim 1 to get a sufficient wet pickup;

(b) drying the polyester fabric until the fabric is dry to the touch; and (c) curing the dried fabric in a temperature range of 160° to 200° C for about 30 to 90 seconds.

DETAILED DESCRIPTION OF INVENTION

The 2,3-dibromopropyl polyoxyethylene trimellitate of the present invention can be prepared by reacting 2,3-dibromopropanol with either trimellitic anhydride or trimellitic anhydride monoacid chloride resulting in an intermediate dibromopropyltrimellitic anhydride product. This intermediate product is then reacted with polyoxyethylene glycols (or their derivatives) to give the desired carboxylic trimellitates.

Representative polyoxyethylene derivatives useful as starting materials in preparing the compound of this invention are:

(1) Polyoxyethylene glycols, HO(CH$_2$CH$_2$O)$_n$H. These glycols are sold under the Trademark Carbowax, with a number as part of the mark, such as: Carbowax 400 or Carbowax 600. The number after the Trademark denotes the average molecular weight.

(2) Polyoxyethylated alcohols, HO(CH$_2$CH$_2$O)$_n$CH$_3$. These derivatives are sold under the Trademark Methoxy Carbowax, with a number as part of the mark, such as: Methoxy Carbowax 350. The number after the Trademark denotes the average molecular weight.

Preferred polyoxyethylated glycols or alcohols are those having a molecular weight of about 300 to 1000. The use of polyols with substantially lower molecular weight results in reduced soil release performance after multiple launderings. The higher molecular weight polyols give compositions with good soil release but poor flame retardant properties. Although the present invention has been specifically described as being prepared from polyethylene glycols, mixed polyoxyethylene-polyoxypropylene glycols or amino polyethylene glycols-polypropylene glycols may also be used to prepare the compound of this invention.

Some representative compositions of this invention are:

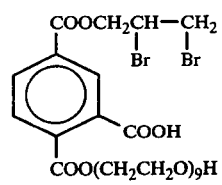 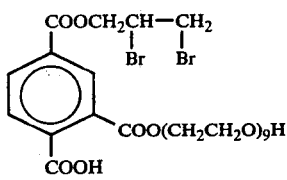 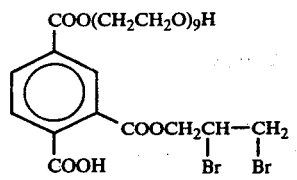
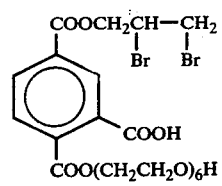 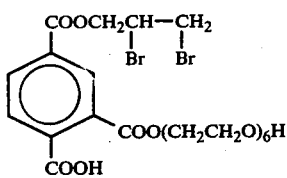 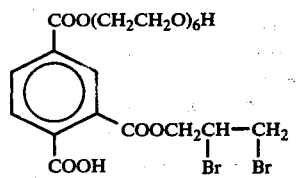
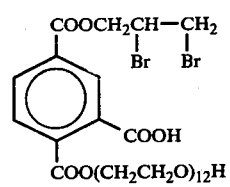 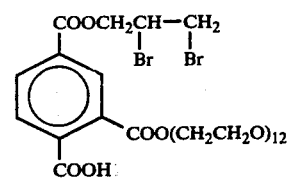 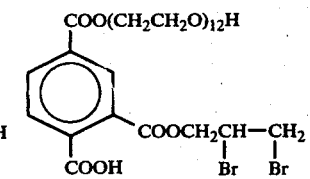
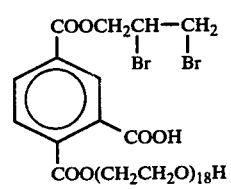 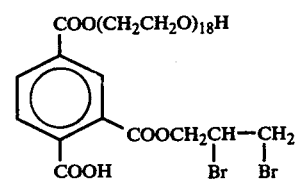 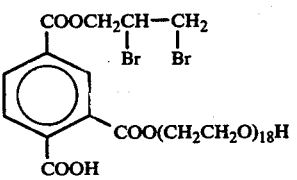
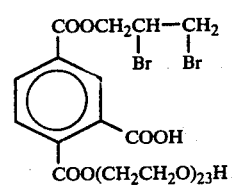 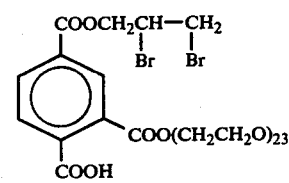 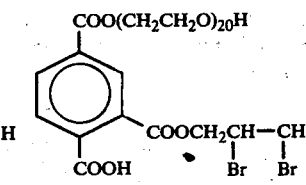
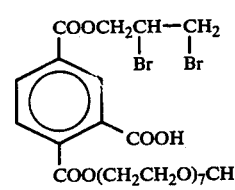 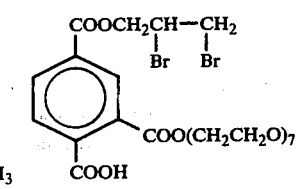 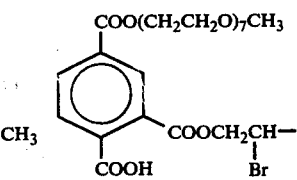
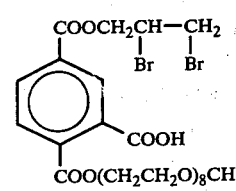 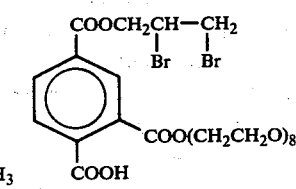 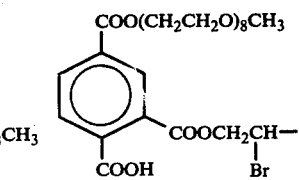
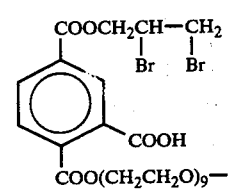 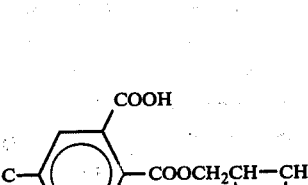 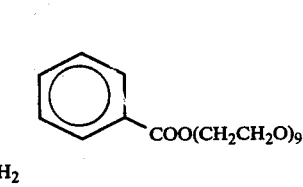

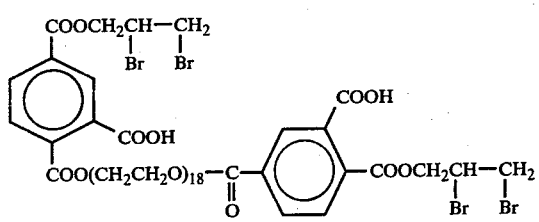
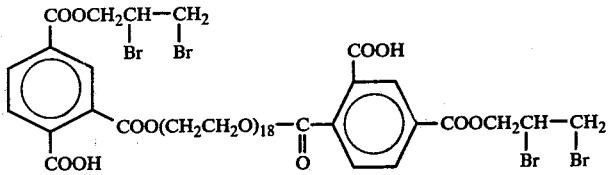
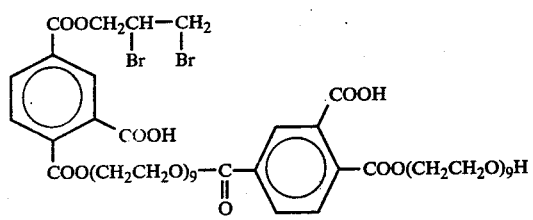
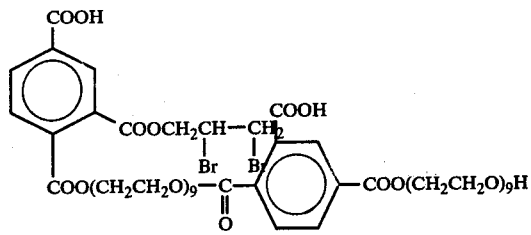
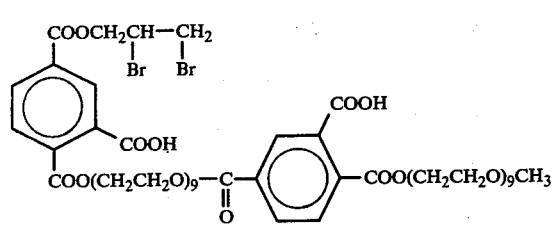
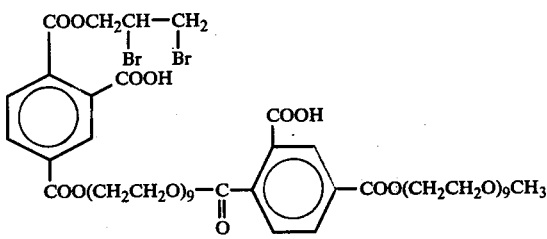
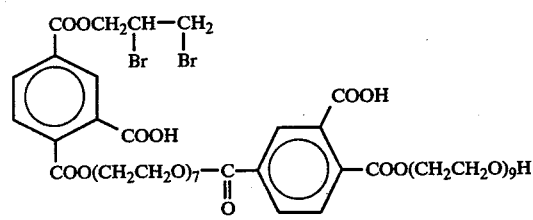
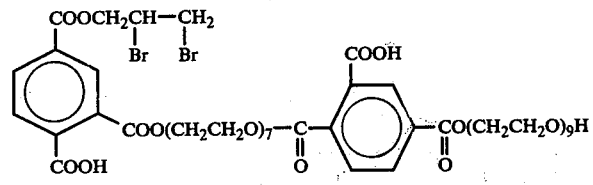
Preferred soil releasing and flame retarding compositions are:
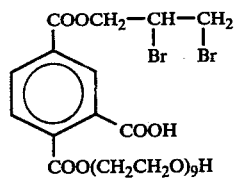
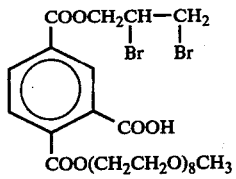
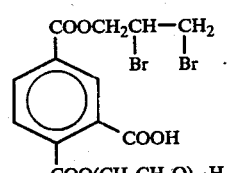
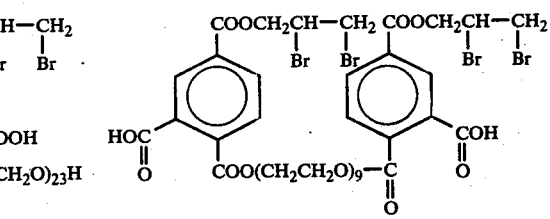
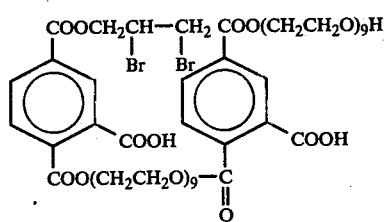

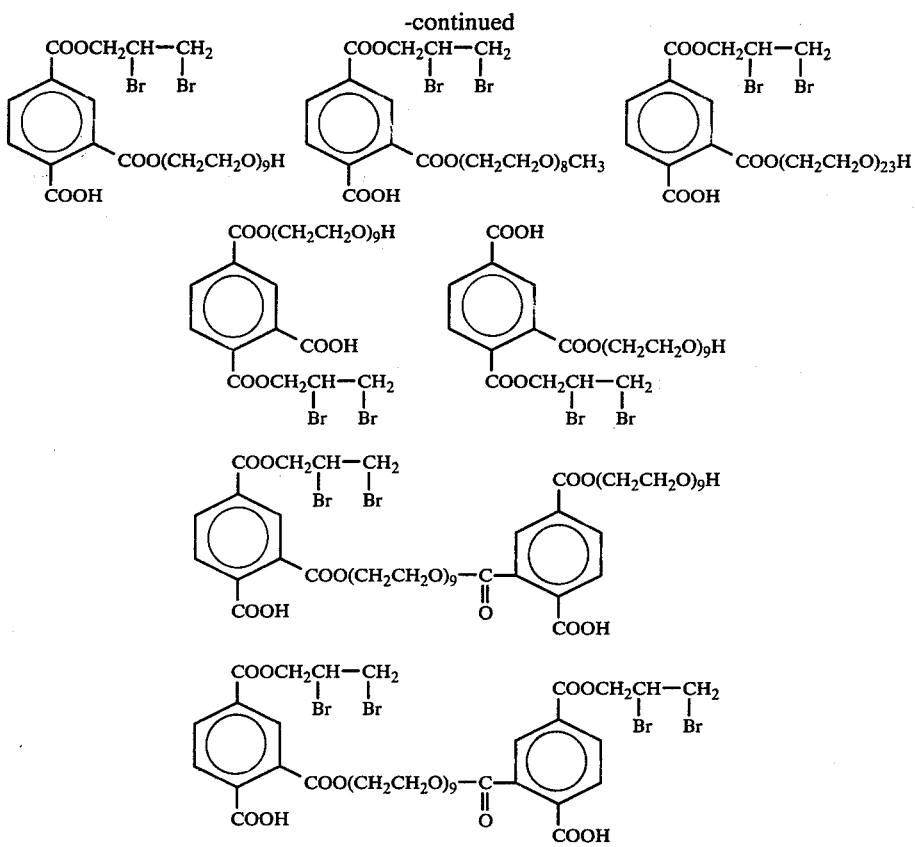

In the treatment of fabrics such as 100% polyester, the 2,3-dibromopropyl polyoxyethylene trimellitate of the present invention can be applied in any convenient manner but is normally applied from either a solvent or an aqueous pad bath with a wet pick-up of about 70-100%. The pad bath solution normally contains 50 to 95 parts (percent) by weight of a solvent such as acetone, toluene, perchloroethylene or water and 5 to 50 parts by weight of the 2,3-dibromopropyl polyoxyethylene trimellitate of the present invention. The fabrics are dried until they are dry to the touch usually in about 3 to 4 minutes at a temperature about 105°-115° C. The dried fabrics are then cured for about 30 to 90 seconds at about 160° to 200° C. The finished fabrics have flame retardancy and soil release durable to at least 50 launderings while also having improved water absorption and wicking properties; this latter effect results in improved comfort to the garment wearer.

In the following examples stain removal is evaluated by visual observation using Test Method 130-1974 as described in the Technical Manual of the American Association for Textile Chemists and Colorists (AATCC), Howes Publishing Co., 44 E. 23rd St., New York, with overhead lighting arranged as described in the test procedure. The fabrics are stained with Nujol according to the test method and additionally with butter, Wesson Oil, and mustard as in the Sears Test TP-1-4; then they are washed according to Test Method 130-1974, placed on a black table top in front of a viewing board having "standard" specimens, and rated according to the criteria shown in the following table:

Table 1

| Rating | Appearance |
|---|---|
| 5 | negligible or no staining (excellent cleanability) |

Table 1-continued

| Rating | Appearance |
|---|---|
| 4 | slightly stained (good cleanability) |
| 3 | noticeably stained (fair cleanability) |
| 2 | considerably stained (poor cleanability) |
| 1 | heavily stained (very poor cleanability) |

The fabrics are evaluated for water adsorcency by AATCC Test Method 79-1975.

The following examples illustrate the present invention but are not intended to limit the invention thereto.

EXAMPLE I

Preparation of Dibromopropyltrimellitic Anhydride

To a 3-neck, round-bottom flask is added 210.5 g (1.0 mole) of trimellitic anhydride monoacid chloride and 218 (1.0 mole) of 2,3-dibromopropanol. The mixture is warmed with stirring at 110°-130° C for 3-4 hours, or until all the hydrogen chloride evolution ceases. NMR analysis of the resulting product (95% yield) shows 3 aromatic protons and 5 aliphatic protons in field strength areas consistent with the structure:

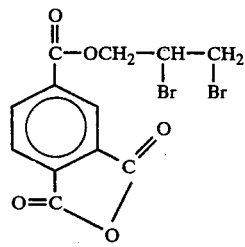

Anal. Calcd. for $C_{12}H_8Br_2O_5$: C, 36.77; H, 2.06; Br, 40.77 Found: C, 37.40; H, 1.95; Br, 39.40.

EXAMPLE II

To 392 g (1.0 mole) of the product of Example 1 is added 400 g (1.0 mole) Carbowax 400 all at once and the mixture heated for 3 hours at 110°–130° C. The desired product is isolated in essentially quantitative yield. Calcd. mol. wt., 792; found, 791. The analytical data (IR, $H^1$nmr) are consistent with assigned structures:

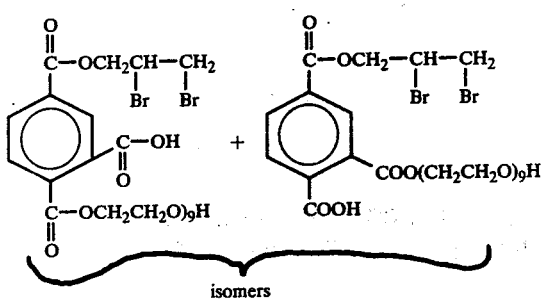

isomers

EXAMPLE III

To 192 g (1.0 mole) of trimellitic anhydride is added 218 g (1.0 mole) of 2,3-dibromopropanol and 200 g toluene. The reaction mixture is stirred and heated for one hour or until the anhydride absorption band in the infrared spectrum substantially disappears. Then 400 g (1.0 mole) of Carbowax 400 is added all at once and the mixture refluxed until 1.0 mole (18.0 g) of water is collected by azeotropic removal into a Dean & Stark trap. The desired product is isolated in essentially quantitative yield. Calcd. mol. wt., 792; found, 782; % Br calcd., 20.2%; %Br found, 21.3. The analytical data (IR, H'nmr) are consistent with the assigned structure:

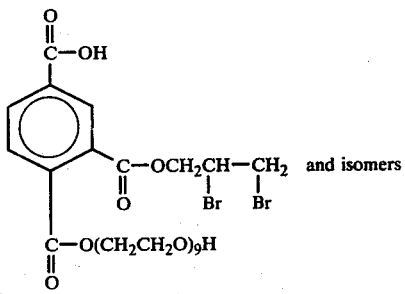

and isomers

EXAMPLES IV–VI

| EXAMPLES IV–VII | | | |
|---|---|---|---|
| (The following preparations were carried out as in EXAMPLE 2 using the reactants set forth below) | | | |
| Example No. | Anhydride of Example 1 | Hydroxy Compound | Product Structure (includes all 1,3,4 isomers) |
| IV | 2.0 mole | $HO(CH_2CH_2O)_9H$ (Carbowax 400) | (structure with two trimellitate aromatic rings each bearing $-C(O)OCH_2CH-CH_2$ with Br, Br substituents and COOH, connected via $-COO(CH_2CH_2O)_9-$ linkage) |
| V | 1.0 mole | $HO(CH_2CH_2O)_8CH_3$ (Methoxy Carbowax 350) | (aromatic ring with $-C(O)OCH_2CH-CH_2$ with Br, Br; COOH; $COO(CH_2CH_2O)_8CH_3$) |
| VI | 1.0 mole | $HO(CH_2CH_2O)_{23}H$ (Carbowax 1000) | (aromatic ring with $-C(O)OCH_2CH-CH_2$ with Br, Br; COOH; $COO(CH_2CH_2O)_{23}H$) |

EXAMPLES IV–VII-continued (The following preparations were carried out as in EXAMPLE 2 using the reactants set forth below)

| Example No. | Anhydride of Example 1 | Hydroxy Compound | Product Structure (includes all 1,3,4 isomers) |
|---|---|---|---|
| VII | 1.0 mole | 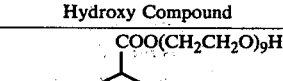 | 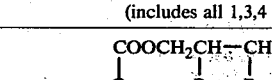 |

EXAMPLE VIII

To a 3-neck, round-bottom flask is added 192.1 g (1.0 mole) of trimellitic anhydride, 218 g (1.0 mole) of 2,3-dibromopropanol, 2 ml of sulfuric acid, 400 g (1.0 mole) of Carbowax 400, and 500 ml of toluene. The mixture is heated for 16 hours or until the water of condensation (18 ml) is azeotropically removed. The solvent is vacuum stripped to give the desired product in essentially quantitative yield. The structure can be visualized as:

EXAMPLE IX

To a 3-neck, round-bottom flask is added 192.1 g (1.0 mole) of trimellitic anhydride, 218 g (1.0 mole) of 2,3-dibromopropanol, 400 g (1.0 mole) of Carbowax 400, 2 g sulfuric acid and 250 ml of xylene is added. Then the mixture is heated until all water of condensation (36.0 g) is removed, corresponding to reaction of residual OH and COOH groups. The product is isolated in essentially quantitative yield and analysis indicates the absence of free COOH and OH groups. Spectroscopic and molecular weight data suggest a cyclic product:

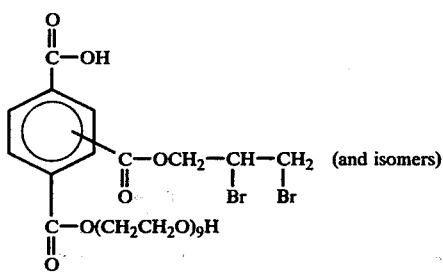

(and isomers)

EXAMPLE X

To 392 g (1.0 mole) of the product of EXAMPLE 1 is added 6,000 g (1.0 mole) of dry Carbowax 6000 all at once and the mixture heated for three hours at 100°–190° C. The desired product is isolated in essentially quantitative yield and analysis is consistent with the structures:

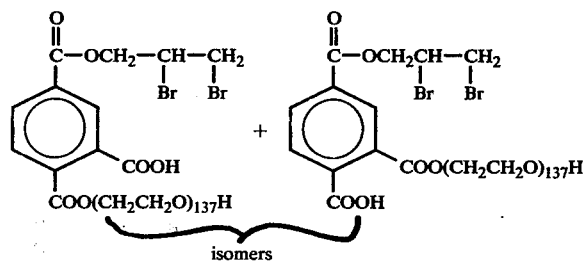

isomers

Flame Retardancy - Soil Release and Water Wicking Results of EXAMPLES 2 to 10 Using 100% Undyed Polyester-Texturized Twill 2.2 oz/yd.$^2$

| Example # | % Add-on owf | Calcd. % Br | Flame Retardancy DOCFF-3-71 Char Length in Inches | | Soil Release Using AATCC Test Method 130-1974 and Sears Test # TP-1-4[e] | | Water Wicking Using AATCC Test #79-1975 (Seconds[c]) |
|---|---|---|---|---|---|---|---|
| | | | 25 Wash | 50 Wash | 25 Wash | 50 Wash | 5 Wash |
| Fabric Blank | — | — | — | BEL[a] to 5 | 2.0 | 2.5 | 5.3 |
| Tris[d] | 2.3 | 1.6 | — | BEL | — | — | — |
| | 4.7 | 3.2 | 4.3 | BEL | 2.5 | 2.6 | — |
| | 9.9 | 6.8 | 4.2 | 4.5 | 1.6 | 1.9 | 13 |
| FC-218 | 0.9 | 0 | BEL to 4.7 | BEL to 4.7 | 3.9 | 3.0 | 100+ |
| FC-218 + Tris | 15.8 | 8.4 | 4.3 | 3.7 | 2.5 | 2.5 | 100+ |
| Zelcon TGF | 0.9 | 0 | BEL | BEL | 2.3 | 2.3 | 5 |
| Zelcon TGF + Tris | 9.8 | 6.3 | — | 5.3 | 1.5 | 1.3 | 6.7 |

-continued

Flame Retardancy - Soil Release and Water Wicking Results
of EXAMPLES 2 to 10 Using 100% Undyed Polyester-Texturized Twill 2.2 oz/yd.$^2$

| Example # | % Add-on owf | Calcd. % Br | Flame Retardancy DOCFF-3-71 Char Length in Inches | | Soil Release Using AATCC Test Method 130-1974 and Sears Test # TP-1-4$^{e)}$ | | Water Wicking Using AATCC Test #79-1975, (Seconds$^{c)}$) |
|---|---|---|---|---|---|---|---|
| | | | 25 Wash | 50 Wash | 25 Wash | 50 Wash | 5 Wash |
| | 14.7 | 7.3 | 4.3 | 3.8 | 3.2 | 1.9 | 6 |
| Example 2 | 10 | 2.0 | 4.0 | 3.7 | 3.4 | 3.4 | 4.1 |
| | 31.1 | 6.3 | 5.0 | 4.5 | 3.8 | 3.8 | — |
| Example 3 | 7.9 | 1.6 | — | 3.8 | 3.1 | 4.0 | 2.5 |
| Example 4 | 10.9 | 2.9 | 3.4 | 4.2 | 3.1 | 2.9 | 3.0$^{b)}$ |
| Example 5 | 6.7 | 1.3 | 4.2 | — | 2.6 | — | 3.0 |
| Example 6 | 9.9 | 1.1 | 3.3 | — | 1.3 | — | 4.1 |
| Example 7 | 5.6 | 0.7 | — | 3.7 | — | 2.6 | 11.9 |
| Example 8 | 10.9 | 2.2 | 3.5 | 4.1 | 3.6 | 3.6 | 3.4$^{b)}$ |
| Example 9 | 8.0 | 1.6 | BEL | BEL | 1.6 | 1.5 | 24.4 |
| Example 10 | 4.5 | 0.1 | BEL | BEL | 2.5 | 2.75 | — |

$^{a)}$BEL signifies Burns Entire Length (unacceptable).
$^{b)}$25-wash data.
$^{c)}$The lower the number the better it wicks.
$^{d)}$Tris(2,3-dibromopropyl)phosphate.
$^{e)}$The fabrics were stained with Nujol according to AATCC Test method 130-1974 and additionally Wesson Oil, and mustard as in the Sears Test TP-1-4.

What is claimed is:

1. A compound having the formula

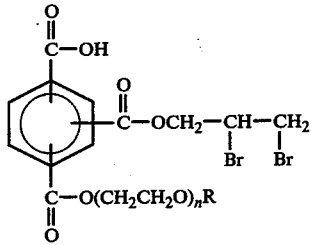

wherein
(a) the ring is 1,2,4 substituted;
(b) R is selected from H, —CH$_3$ or

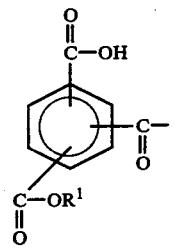

with the ring being 1,2,4 substituted;
(c) R$^1$ is selected from

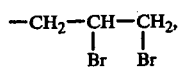

(—CH$_2$CH$_2$O)$_n$H or (—CH$_2$CH$_2$O)$_n$CH$_3$; and
(d) $n$ is 6–23.

2. The compound of claim 1 wherein R is H and $n$ is 9.

3. The compound of claim 1 wherein R is —CH$_3$ and $n$ is 7.

4. The compound of claim 1 wherein R is

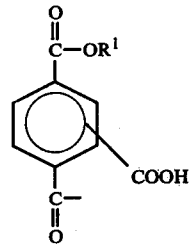

and R$^1$ is

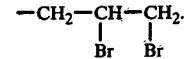

5. The compound of claim 1 wherein R is

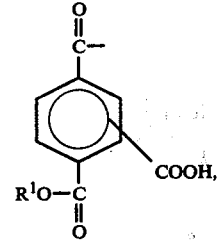

R$^1$ is —(CH$_2$CH$_2$)$_n$H and $n$ is 9.

6. The compound of claim 1 wherein R is H and $n$ is 23.

* * * * *